US006943755B1

(12) United States Patent
Bartow (10) Patent No.: US 6,943,755 B1
(45) Date of Patent: Sep. 13, 2005

(54) CARD-ENABLED, HEAD-WEARABLE SECONDARY DISPLAY SYSTEMS

(75) Inventor: Douglas Bowen Bartow, Greensboro, NC (US)

(73) Assignee: Analog Devices, Inc., Norwood, MA (US)

( * ) Notice: Subject to any disclaimer, the term of this patent is extended or adjusted under 35 U.S.C. 154(b) by 383 days.

(21) Appl. No.: 10/267,890

(22) Filed: Oct. 7, 2002

(51) Int. Cl.$^7$ .............................................. G09G 5/00
(52) U.S. Cl. ............................................ 345/8; 345/7
(58) Field of Search ......... 345/7–9; 326/83; 385/8–10, 385/88–90

(56) References Cited

U.S. PATENT DOCUMENTS

| | | |
|---|---|---|
| 5,844,824 A | 12/1998 | Newman et al. |
| 5,948,047 A | 9/1999 | Jenkins |
| 6,313,662 B1 * | 11/2001 | Ide .............................. 326/83 |
| 6,351,388 B1 | 2/2002 | Jenkins et al. |
| 6,457,024 B1 * | 9/2002 | Felsentein et al. ............. 345/8 |
| 6,502,997 B1 * | 1/2003 | Lee et al. ..................... 385/88 |
| 6,614,948 B2 * | 9/2003 | Jacobowitz et al. .......... 385/10 |
| 2002/0149545 A1 * | 10/2002 | Hanayama et al. ............ 345/7 |

OTHER PUBLICATIONS

"Display-to-Go" Brochure, pp 6, MARGI Systems, Inc., 3155 Kearney Street, Fremont, California 94538 Web Site: www.margi.com.

* cited by examiner

Primary Examiner—Xiao Wu
(74) Attorney, Agent, or Firm—Koppel, Jacobs, Patrick & Heybl (57) ABSTRACT

Simple, inexpensive, lightweight secondary display systems are provided which extract video data and a direct coupled (DC) voltage from the CardBus slot of a computer. The video data is converted to a video display signal in a video controller and preferably coupled to a head-wearable display (HWD) over an optical fiber. The HWD is powered by the DC voltage which is coupled to it by a metallic conductor bundled with the optical fiber.

38 Claims, 4 Drawing Sheets

CARD-ENABLED, HEAD-WEARABLE SECONDARY DISPLAY SYSTEMS

BACKGROUND OF THE INVENTION

1. Field of the Invention

The present invention relates generally to secondary display systems for computers.

2. Description of the Related Art

Computer systems generally present data on a primary display which is often integral to the system. However, secondary displays (e.g., monitors, projectors, plasma displays and head-wearable displays) are desirable for a variety of purposes (e.g., to enhance communications in meetings and conferences and to simplify an application display by partitioning it into primary and secondary portions).

When used, for example, with a laptop computer, secondary display systems generally receive video display signals from one of the laptop's external ports (e.g., a video graphics array (VGA) port) which is limited to a predetermined resolution and refresh rate. Although resolution selection can be provided by other secondary display systems that process video data from the computer's CardBus slot, these systems typically require large, independent power sources (e.g., battery or power converter).

BRIEF SUMMARY OF THE INVENTION

The present invention is directed to simple, inexpensive, lightweight secondary display systems. These goals are realized with a CardBus card, a head-wearable display and a light, flexible interface structure. When the card is inserted into the CardBus slot of a computer (e.g., a laptop computer), a video display signal and a direct current (DC) voltage are coupled to the head-wearable display without the need for additional power sources.

The novel features of the invention are set forth with particularity in the appended claims. The invention will be best understood from the following description when read in conjunction with the accompanying drawings.

DETAILED DESCRIPTION OF THE INVENTION

Figure 1:
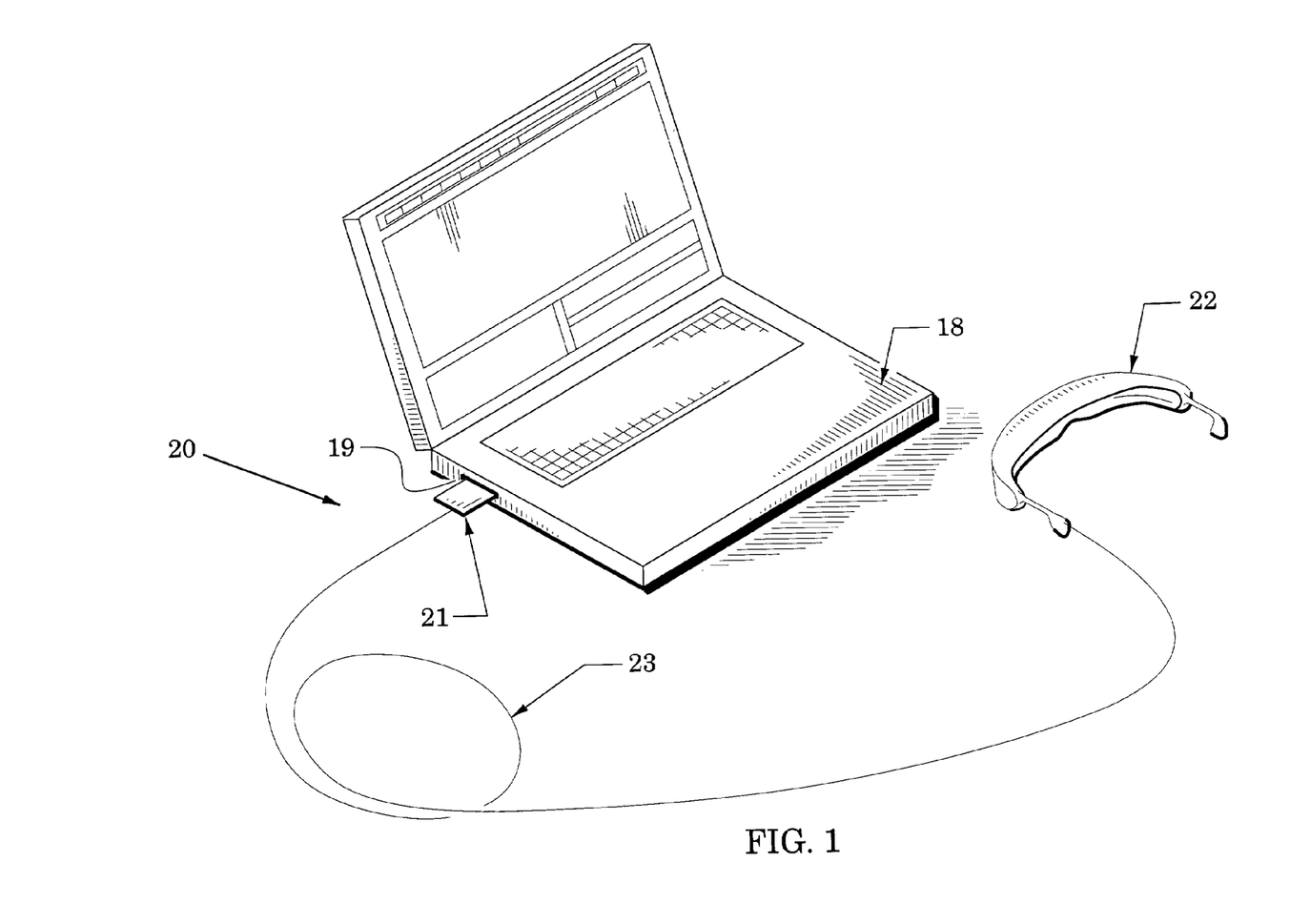
FIG. 1 is a perspective diagram of a secondary display system embodiment of the present invention in association with a laptop computer.

FIG. 1 illustrates a secondary display system 20 that includes a card 21, a head-wearable display (HWD) 22 and an interconnect structure 23. The card 21 is coupled to a laptop computer 18 by insertion into the computer's Card-Bus slot 19 which provides video data and a DC voltage and is configured in accordance with the standards of the Personal Computer Memory Card International Association (PCMCIA).

The HWD 22 can complement or even replace the computer's primary display. For example, the two displays can show different resolutions, different views of an application or even displays of different applications. Alternatively, the HWD 22 can be used in locations (e.g., closely-spaced airline seats) where restricted space makes it inconvenient to use the primary display. Use in such restricted situations is further enhanced by the system's simplicity and light weight which are obtained because it does not require an additional power supply (e.g., battery or power converter).

Figure 2:
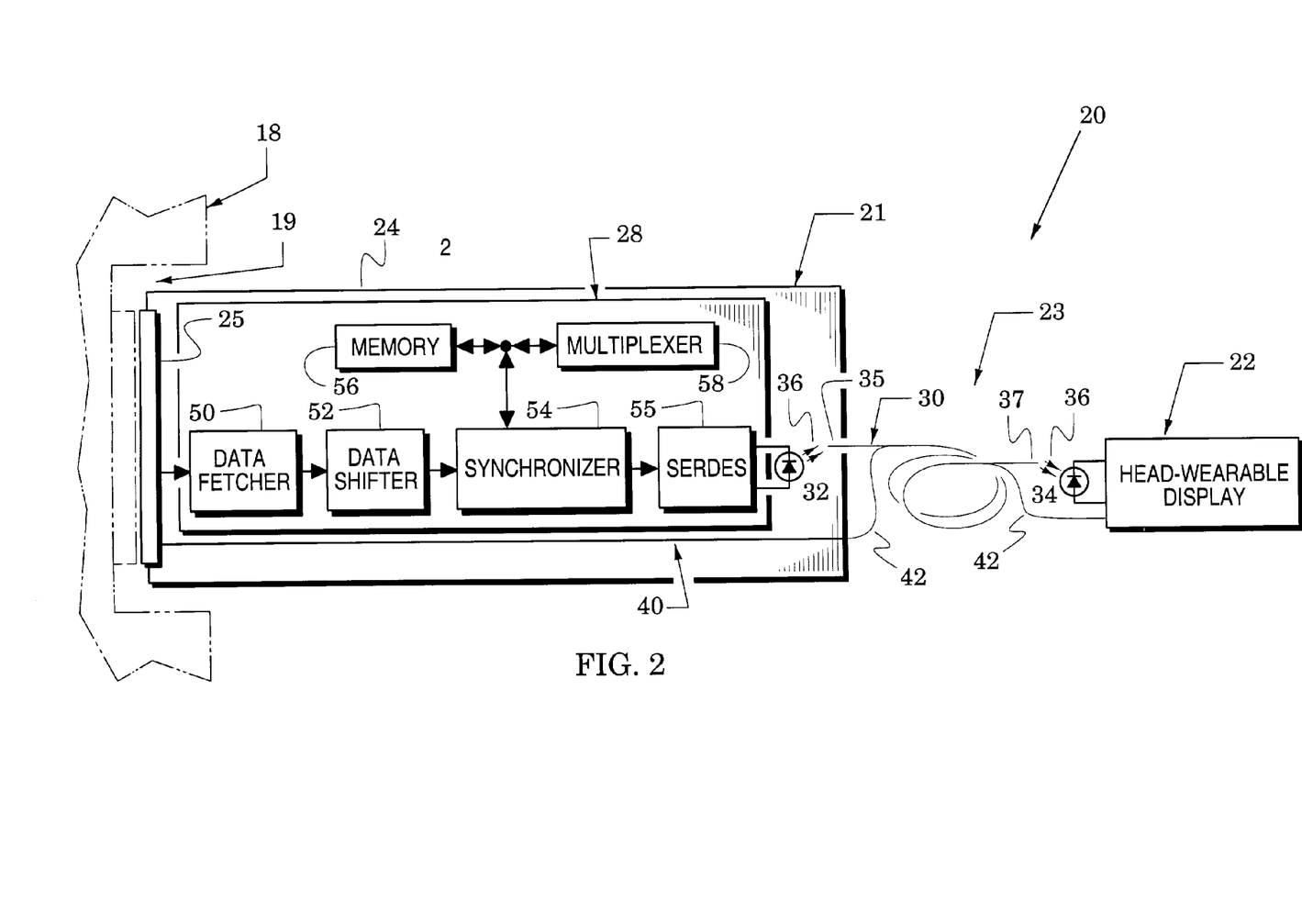
FIG. 2 is a block diagram of the system of FIG. 1.

As particularly shown in FIG. 2, the card 21 includes a card body 24 and a connector 25 that is carried on the body wherein both are configured in accordance with the standards of the PCMCIA so that the connector mates with the CardBus slot 19. The system further includes a video controller 28 that is carried on the card body 24 and is coupled to receive the video data from the connector 25 and, in response, generate a corresponding video display signal.

The interconnect structure 23 facilitates transport of the video display signal to the HWD 22. It includes an optical fiber 30, a semiconductor laser 32 and a photodiode 34. The optical fiber has a first end 35 and the semiconductor laser 32 is arranged to radiate a corresponding light signal 36 into the first end 35 in response to the video display signal from the video controller 28.

The light signal 36 is reflectively transported within the optical fiber 30 and issues from a second end 37. The photodiode 34 is arranged to receive the light signal from the second end 37 to thereby deliver the video display signal to the HWD 22. In particular, the photodiode's reverse current is altered in accordance with impinging photons of the light signal 36. The altered current is converted to conventional signals (e.g., CMOS rail-to-rail signals) within the HWD 22.

As further shown in FIG. 2, the card body 24 also carries a transmission line 40 which receives the DC voltage from the CardBus slot 19 via the connector 25. The transmission line can be realized in any convenient form (e.g., a plated line on or within the card body 24) that conducts the DC voltage along the card body and delivers it to at least one flexible metallic conductor 42 which provides it to the HWD 22. Preferably, a second flexible metallic conductor delivers an associated reference potential (e.g., ground) to the HWD.

In operation of the display system 20, the HWD receives its operating voltage from the conductor 42 and its video display signal from the photodiode 34. The video controller 28 preferably includes a data fetcher 50, a data shifter 52, a synchronizer 54 and a serializer/deserializer (SerDes) 55. The data fetcher 50 includes elements (e.g., a video address counter) that facilitate extraction of video data from the CardBus slot 19.

The extracted data is presented to the data shifter 52 which arranges the data in a pixel stream. The synchronizer 54 includes elements (e.g., horizontal and vertical pixel counters) that insert synchronization (sync) pulses which frame the pixel stream into lines and fields. The video data stream is then converted to a serial format in the SerDes 55 and transmitted over the optical fiber 30 to the HWD 22 (where it is typically deserialized back to parallel data in another SerDes). The foregoing operations are preferably facilitated by memory 56 for temporary data storage and multiplexers 58 for data routing.

Figure 3:
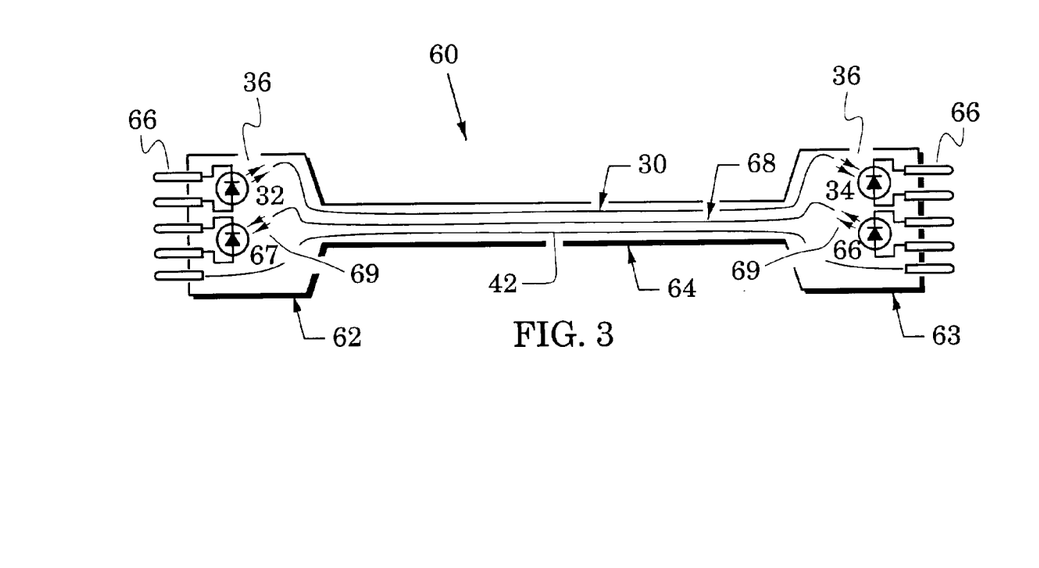
FIG. 3 is a diagram of an interconnect structure for use in the systems of FIGS. 1 and 2.

Although the semiconductor laser 32 can be realized in various conventional forms (e.g., a vertical cavity surface emitting laser (VCSEL)), it is important that its light signal 36 be enclosed to block it from inadvertently striking and damaging the eyes of a user of the system 20. Accordingly, FIG. 3 illustrates an interconnect structure 60 that combines shells 62 and 63 with a flexible, plastic sheath 64. The optical fiber 30 and the conductor 42 are carried within the sheath and the semiconductor laser 32 and the photodiode 34 are housed within respective shells so that the light signal 36 is contained and cannot endanger the user.

To further enhance this containment, the shells are preferably permanently coupled to the sheath to inhibit disassembly. Each of the shells includes electrical contacts 66 that can mate with corresponding contacts carried on the card body 24 and the HWD 22. Alternatively, at least one of the shells can be an integral portion of its mating structure. For example, the shell 62 (or a corresponding end of the sheath 64) can be formed to be integral with the card body 24. In this embodiment, the shell 63 can be removably mated to the HWD 22.

Preferably, display system embodiments of the invention include a return data path from the HWD 22 to the video controller 28. This path can be used for various communication purposes such as display identification data from the HWD that provides configuration information (e.g., the display's native resolution) for optimal projection of images in the HWD. In response to the display identification data, the video controller 28 can, for example, automatically scale graphics data to optimally fit the resolution of the display.

The display identification data can be transmitted in any form that characterizes the electrical response of the display graphics in the HWD. An exemplary data form is Exended Display Identification Data (EDID) which is a data standard of the Video Electronics Standards Association (VESA) which is an international trade association having headquarters in Milpitas, Calif.

The return data path is realized in FIG. 3 with another semiconductor laser 66 and another photodiode 67 that are respectively coupled between electrical contacts 65 in the shells 63 and 62. Another optical fiber 68 is carried within the sheath 64 to receive light signals 69 from the semiconductor laser 66 and deliver these light signals to the photodiode 67. Other exemplary data that can be transmitted over the return data path includes audio signals that are carried from a microphone in the HWD 22 of FIG. 2 to the video controller 28 for further processing.

It is noted that the single optical fiber 30 of FIG. 3 will generally be sufficient to transmit video data to lower-resolution displays (e.g., displays covered by the graphics standards of extended graphics array (XGA) and super video graphics array (SVGA)) but that a second optical fiber (and corresponding semiconductor laser and photodiode) may be required to support higher-resolution displays (e.g., displays covered by the graphics standards of super extended graphics array (SXGA) and ultra extended graphics array (UXGA)).

Figure 4:
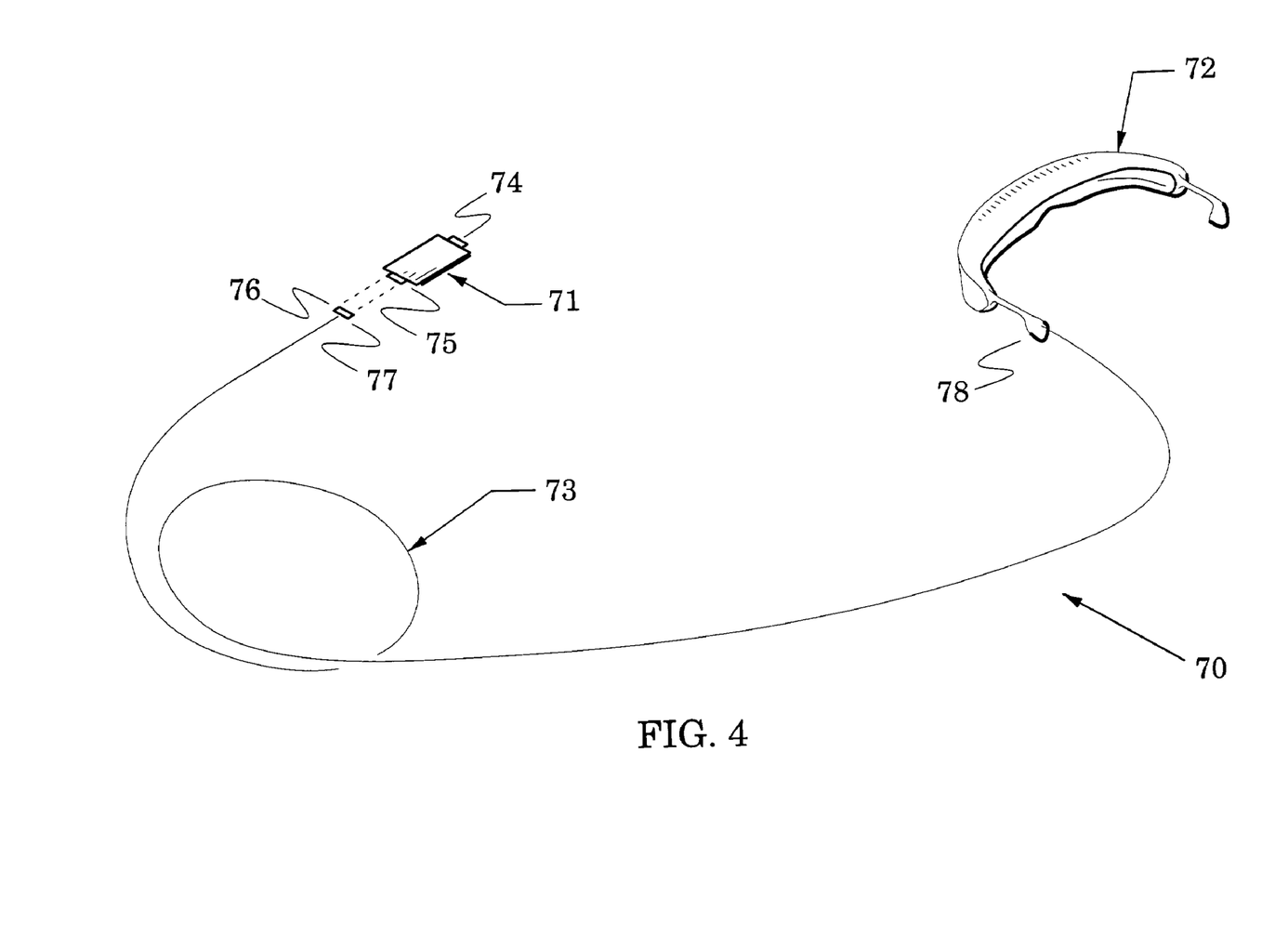
FIG. 4 is a perspective diagram of another secondary display system embodiment.

FIG. 4 illustrates another display system embodiment 70 that includes a card 71 and an HWD 72 that has an integral flexible interconnect 73. The card 71 is similar to the card 21 of FIGS. 1 and 2 and has a first connector 74 similar to the connector 25 of FIG. 2. However, the card 71 further includes a second connector 75 that receives the video data signal from the video controller (28 in FIG. 2) and is also coupled to the transmission line (40 in FIG. 2).

The interconnect 73 terminates in a third connector 76 that is configured for mating with the second connector 75. The semiconductor laser (32 in FIG. 2) is carried in the interconnect 73 (e.g., in the region of a location 77) to receive the video display signal through the second and third connectors 75 and 76 and radiate a corresponding light signal.

An optical fiber (30 in FIG. 2) is carried in the interconnect 73 to receive and transport the light signal away from the laser and a photodiode (34 in FIG. 2) is positioned in the head-wearable display 72 (e.g., in the region of a location 78). The photodiode receives the light signal from the optical fiber and thereby provides the video display signal to the head-wearable display.

At least one metallic conductor (42 in FIG. 3) is also carried in the interconnect 73 to receive and transport the DC voltage from the second and third connectors 75 and 76 to the head-wearable display. The interconnect 73 preferably includes a flexible sheath (64 in FIG. 3) that encloses the optical fiber and the conductor and the sheath is preferably permanently coupled to the third connector 76 to inhibit disassembly (e.g., it is an integral portion of the third connector 76) and thereby block the laser's radiation from inadvertently striking the eyes of a user of the system 70.

The interconnect structure 23 of FIG. 2 is particularly suited for coupling the video display signal to the HWD 22 in the form of the light signal 36 which induces corresponding current changes in the photodiode 34. Some HWDs, however, may be more compatible with electrical interconnect signals (e.g., CMOS rail-to-rail or low voltage differential signaling (LVDS)). Accordingly, other interconnect structure embodiments replace the optical fiber 30 (and its associated semiconductor laser 32 and photodiode 34) of FIG. 2 with flexible metallic conductors and line drivers.

Figure 5A:
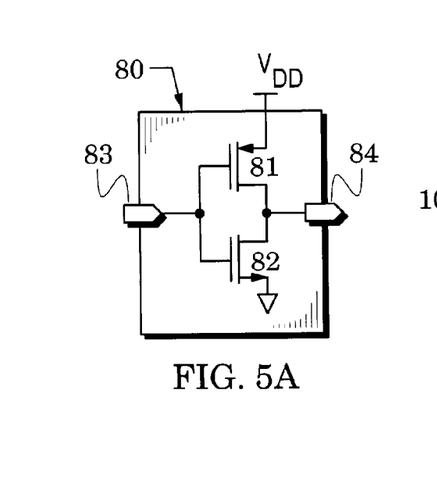
FIGS. 5A and 5B illustrate line driver embodiments for other interconnect structures in the systems of FIGS. 1 and 2.

FIG. 5A, for example, illustrates a line driver in the form of a CMOS inverter 80 that is formed with drain-coupled CMOS transistors 81 and 82 whose sources are coupled between potential rails VDD and ground and whose gates are coupled to an input port 83. In response to a CMOS video display signal (from the video controller 28 of FIG. 2) at the input port, the inverter 80 generates CMOS rail-to-rail signals at the transistor drains which drive an output port 84. The video display signal can thus be converted to a CMOS rail-to-rail signal which is coupled to the HWD 22 of FIG. 2 with metallic conductors that are bundled with the metallic conductor 42.

Figure 5B:
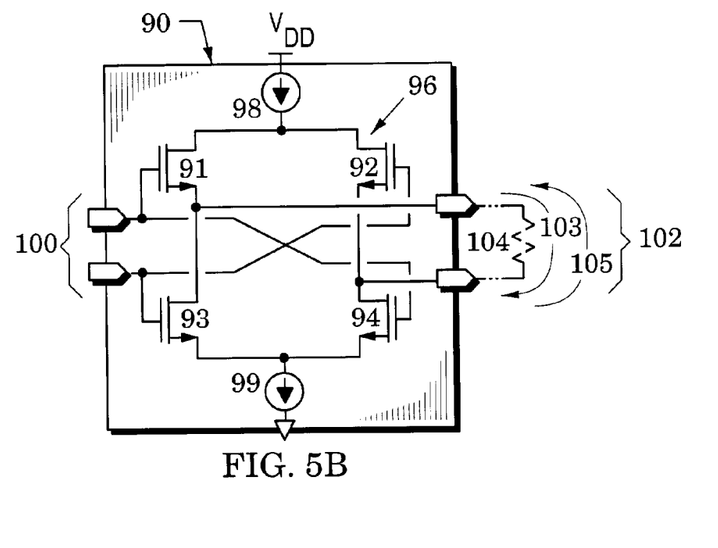

In another line driver embodiment, FIG. 5B illustrates an LVDS structure 90 that includes first, second, third and fourth current-steering switches 91, 92, 93 and 94 that are formed by CMOS transistors and are serially-connected to form a circuit bridge 96. Current sources 98 and 99 are coupled to the top and bottom of the bridge 96. The first and fourth switches 91 and 94 respond to one side of a differential input port 100 and the second and third switches 92 and 93 respond to the other side. A differential output port 102 is coupled across the bridge 96.

In response to one state of a differential input signal at the input port 100, the first and fourth switches 91 and 94 close to steer a bridge current 103 (current of sources 98 and 99) through a load 104 that is associated with the output port 102. In response to another state of the differential input signal, the second and third switches 92 and 93 close to steer an oppositely-directed bridge current 105 through the load 104. The video display signal can thus be converted to the differential currents of an LVDS signal that is coupled to the HWD 22 of FIG. 2 with metallic conductors that are bundled with the metallic conductor 42. The load 104 is preferably associated with receive elements (e.g., differential amplifier) of the HWD 22.

It is noted that PC cards are credit card-sized removable modules that are designed in accordance with standards provided by the PCMCIA—an organization of computer-associated companies. As described by the PC Card Standard of the PCMCIA, the connector 25 of FIG. 2 has 68 pins and the data paths of the card 21 can be either 16-bit paths or 32-bit paths.

In the terminology of the PC Card Standard, a card that supports 16-bit data paths is a PC Card and a card that supports 32-bit data paths is a CardBus Card. PC Cards may be designed to operate with 3.3 volt and 5 volt power forms whereas CardBus Cards operate only with a 3.3 volt power form. A CardBus Card typically includes a grounding strip arranged over the connector 25 of FIG. 2. Although older computers typically provide a PC Card slot which only accepts PC Cards, current computers generally provide a CardBus slot which will accept both PC Cards and CardBus Cards. In either case, the cards are supported by PCMCIA-documented software (e.g., Card Services and Socket Services) that is installed at startup in the computer 18 of FIG. 1.

The width and length of all PC cards are substantially the same as that of credit cards (54 by 85.6 millimeters) but their thickness varies with type. Type I cards are 3.3 mm thick and are typically used to provide additional ROM or RAM memory for a computer. Type II cards are 5.0 mm thick and generally interface with modems, peripheral displays and external systems such as digital cameras, cable TV set-top boxes and local area networks (LANs). Type III cards are 10.5 mm thick and can house peripherals (e.g., a hard disk or a wireless transceiver) that require more space than is provided by Type II cards.

A variety of conventional HWDs are provided by different manufacturers. They are designed to operate in response to a video display signal which may be provided, for example, by the VGA port of a notebook or laptop computer. Their operating power is generally provided, however, by a battery or by a power adapter that converts power from a wall socket. Conventional secondary HWD systems thus require a large power source and their resolution is limited to that supplied by the VGA port.

In contrast, display system embodiments of the present invention extract the DC voltage (typically 3.3 volts) from a computer's CardBus slot and couple this operating voltage to the HWD. Display systems of the invention thus dispense with large power sources and are simple, inexpensive and lightweight as they need only comprise a CardBus Card, a HWD and a flexible interconnect that couples these elements. In addition, the system's data controller (28 in FIG. 2) can be suitably configured to support analog and digital displays. As noted above, the secondary display systems of the invention can supplement a computer's primary display or replace it. The latter function is especially useful in locations where restricted space makes it inconvenient to use the primary display.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A display system that interfaces with a CardBus slot which provides video data and a direct current (DC) voltage, the system comprising:
    a card body;
    a connector carried on said card body and configured to facilitate mating with said CardBus slot;
    a video controller carried on said card body and coupled to said connector to receive said video data and generate, in response, a corresponding video display signal wherein said video controller includes a serializer/deserializer that provides said video display signal in a serial format;
    a head-wearable display responsive to said video display signal;
    an optical fiber having a first end coupled to said card body and a second end coupled to said display;
    a semiconductor laser arranged to radiate a corresponding light signal into said first end in response to said video display signal;
    a photodiode arranged to receive said light signal from said second end and thereby deliver said video display signal to said display;
    a transmission line carried on said card body to receive said DC voltage signal from said connector; and
    at least one metallic conductor coupled between said transmission line and said video display to thereby deliver said DC voltage to said display.

2. The system of claim 1, wherein said card body and said connector are configured in accordance with the 16-bit PC Card portion of the PC Card Standard of the Personal Computer Memory Card International Association.

3. The system of claim 1, wherein said card body and said connector are configured in accordance with the 32-bit CardBus Card portion of the PC Card Standard of the Personal Computer Memory Card International Association.

4. The system of claim 1, wherein said semiconductor laser is carried on said card body.

5. The system of claim 1, wherein said photodiode is carried on said display.

6. The system of claim 1, wherein said semiconductor laser is a vertical cavity surface emitting laser (VCSEL).

7. The system of claim 1, further including a flexible sheath that encloses said optical fiber and said conductor.

8. The system of claim 7, further including at least one shell permanently joined to a respective end of said sheath and enclosing a selected one of said semiconductor laser and said photodiode.

9. The system of claim 1, further including;
    a second optical fiber having a near end coupled to said display and a far end coupled to said card body;
    a second semiconductor laser arranged to radiate a corresponding second light signal into said near end in response to display identification data from said display; and
    a second photodiode arranged to receive said second light signal from said far end and thereby deliver said display identification data to said video controller.

10. The system of claim 1, wherein said card body and said connector are configured in accordance with the standards of the Personal Computer Memory Card International Association.

11. A display system that interfaces with a CardBus slot which provides video data and a direct current (DC) voltage and is configured in accordance with the standards of the Personal Computer Memory Card International Association (PCMCIA), the system comprising:
    a card body configured in accordance with the standards of the PCMCIA;
    a connector carried on said card body and configured in accordance with the standards of the PCMCIA to facilitate mating with said CardBus slot;
    a video controller carried on said card body and coupled to said connector to receive said video data and generate, in response, a corresponding video display signal;

a head-wearable display responsive to said video display signal;

an optical fiber having a first end coupled to said card body and a second end coupled to said display;

a semiconductor laser arranged to radiate a corresponding light signal into said first end in response to said video display signal;

a photodiode arranged to receive said light signal from said second end and thereby deliver said video display signal to said display;

a transmission line carried on said card body to receive said DC voltage signal from said connector; and at least one metallic conductor coupled between said transmission line and said video display to thereby deliver said DC voltage to said display;

wherein said video controller includes:

a data fetcher that extracts said video data from said CardBus slot;

a data shifter that arranges said video data;

a synchronizer that inserts synchronization pulses into said video data; and a serializer/deserializer that serializes said video data into said video display signal.

12. A display interface that interfaces between a head-wearable display and a CardBus slot that provides video data and a direct current (DC) voltage, the system comprising:

a card body configured;

a connector carried on said card body to facilitate mating with said CardBus slot;

a video controller carried on said card body and coupled to said connector to receive said video data and generate, in response, a corresponding video display signal wherein said video controller includes a serializer/deserializer that provides said video display signal in a serial format;

an optical fiber having a first end coupled to said card body and a second end accessible to said display;

a semiconductor laser arranged to radiate a corresponding light signal into said first end in response to said video display signal;

a photodiode arranged to receive said light signal from said second end and thereby provide said video display signal to said display;

a transmission line carried on said card body to receive said DC voltage signal from said connector; and at least one metallic conductor coupled to said transmission line to thereby provide said DC voltage to said display.

13. The interface of claim 12, wherein said card body and said connector are configured in accordance with the 16-bit PC Card portion of the PC Card Standard of the Personal Computer Memory Card International Association.

14. The interface of claim 12, wherein said card body and said connector are configured in accordance with the 32-bit CardBus PC Card portion of the PC Card Standard of the Personal Computer Memory Card International Association.

15. The interface of claim 12, wherein said semiconductor laser is carried on said card body.

16. The system of claim 12, wherein said semiconductor laser is a vertical cavity surface emitting laser (VCSEL).

17. The interface of claim 12, further including a flexible sheath that encloses said optical fiber and said conductor.

18. The interface of claim 17, further including at least one shell permanently joined to a respective end of said sheath and enclosing a selected one of said semiconductor laser and said photodiode.

19. The interface of claim 12, wherein said card body and said connector are configured in accordance with the standards of the Personal Computer Memory Card International Association.

20. A display interface that interfaces between a head-wearable display and a CardBus slot that provides video data and a direct current (DC) voltage and is configured in accordance with the standards of the Personal Computer Memory Card International Association (PCMCIA), the system comprising:

a card body configured in accordance with the standards of the PCMCIA;

a connector carried on said card body and configured in accordance with the standards of the PCMCIA to facilitate mating with said CardBus slot;

a video controller carried on said card body and coupled to said connector to receive said video data and generate, in response, a corresponding video display signal;

an optical fiber having a first end coupled to said card body and a second end accessible to said display;

a semiconductor laser arranged to radiate a corresponding light signal into said first end in response to said video display signal;

a photodiode arranged to receive said light signal from said second end and thereby provide said video display signal to said display;

a transmission line carried on said card body to receive said DC voltage signal from said connector; and at least one metallic conductor coupled to said transmission line to thereby provide said DC voltage to said display;

wherein said video controller includes:

a data fetcher that extracts said video data from said CardBus slot;

a data shifter that arranges said video data;

a synchronizer that inserts synchronization pulses into said video data; and a serializer/deserializer that serializes said video data into said video display signal.

21. The interface of claim 20, wherein said video controller further includes a memory to hold said pixel stream.

22. A display system that interfaces with a CardBus slot which provides video data and a direct current (DC), the system comprising:

a card body;

first and second connectors carried on said card body;

a video controller carried on said card body and coupled to said first connector to receive said video data and, in response, provide, a corresponding video display signal to said second connector wherein said video controller includes a serializer/deserializer that provides said video display signal in a serial format;

a transmission line carried on said card body to couple said DC voltage signal between said first and second connectors;

a head-wearable display that includes a flexible interconnect which terminates in a third connector configured for mating with said second connector;

a semiconductor laser carried in said interconnect to receive said video display signal through said second and third connectors and radiate a corresponding light signal;

an optical fiber carried in said interconnect to receive and transport said light signal away from said laser;

a photodiode in said head-wearable display that receives said light signal from said optical fiber and thereby provides said video display signal to said head-wearable display; and at least one metallic conductor carried in said interconnect to receive and transport said DC voltage from said second and third connectors to said head-wearable display.

23. The system of claim 22, wherein said card body and said connector are configured in accordance with the 16-bit PC Card portion of the PC Card Standard of the Personal Computer Memory Card International Association.

24. The system of claim 22, wherein said card body and said connector are configured in accordance with the 32-bit CardBus PC Card portion of the PC Card Standard of the Personal Computer Memory Card International Association.

25. The system of claim 22, wherein said semiconductor laser is a vertical cavity surface emitting laser (VCSEL).

26. The system of claim 22, wherein said interconnect comprises a flexible sheath that encloses said optical fiber and said conductor.

27. The system of claim 26, wherein said flexible sheath is an integral portion of said third connector.

28. The system of claim 22, further including:
a second semiconductor laser in said head-wearable display that radiates a corresponding second light signal in response to display identification data from said head-wearable display;
a second optical fiber carried in said interconnect to receive and transport said second light signal; and
a second photodiode that receives said second light signal from said second optical fiber and provides said display identification data through said second and third connectors to said video controller.

29. The system of claim 22, wherein said card body and said connector are configured in accordance with the standards of the Personal Computer Memory Card International Association.

30. A display system that interfaces with a CardBus slot which provides video data and a direct current (DC) voltage and is configured in accordance with the standards of the Personal Computer Memory Card International Association (PCMCIA), the system comprising:
a card body configured in accordance with the standards of the PCMCIA;
first and second connectors carried on said card body wherein said first connector is configured in accordance with the standards of the PCMCIA to facilitate mating with said CardBus slot;
a video controller carried on said card body and coupled to said first connector to receive said video data and, in response, provide, a corresponding video display signal to said second connector;
a transmission line carried on said card body to couple said DC voltage signal between said first and second connectors;
a head-wearable display that includes a flexible interconnect which terminates in a third connector configured for mating with said second connector;
a semiconductor laser carried in said interconnect to receive said video display signal through said second and third connectors and radiate a corresponding light signal;
an optical fiber carried in said interconnect to receive and transport said light signal away from said laser;

a photodiode in said head-wearable display that receives said light signal from said optical fiber and thereby provides said video display signal to said head-wearable display; and at least one metallic conductor carried in said interconnect to receive and transport said DC voltage from said second and third connectors to said head-wearable display;

wherein said video controller includes:
a data fetcher that extracts said video data from said CardBus slot;
a data shifter that arranges said video data;
a synchronizer that inserts synchronization pulses into said video data; and
a serializer/deserializer that serializes said video data into said video display signal.

31. A display system that interfaces with a CardBus slot which provides video data and a direct current (DC) voltage, the system comprising:
a card body;
a connector carried on said card body to facilitate mating with said CardBus slot;
a video controller carried on said card body and coupled to said connector to receive said video data and generate, in response, a corresponding video display signal wherein said video controller includes a serializer/deserializer that provides said video display signal in a serial format;
a transmission line carried on said card body to receive said DC voltage signal from said connector;
a head-wearable display responsive to said video display signal;
at least two metallic conductors coupled between said card body and said video display with one of said conductors coupled to said transmission line to thereby provide said DC voltage to said display; and
a line driver inserted between said video controller and the other of said conductors to provide said video display signal to said display.

32. The system of claim 31, wherein said card body and said connector are configured in accordance with the 16-bit PC Card portion of the PC Card Standard of the Personal Computer Memory Card International Association.

33. The system of claim 31, wherein said card body and said connector are configured in accordance with the 32-bit CardBus PC Card portion of the PC Card Standard of the Personal Computer Memory Card International Association.

34. The system of claim 31, wherein said line driver includes a complementary metal-oxide-semiconductor (CMOS) inverter.

35. The system of claim 31, wherein said line driver includes a low voltage differential signaling (LVDS) driver.

36. The system of claim 31, wherein said card body and said connector are configured in accordance with the standards of the Personal Computer Memory Card International Association.

37. A display system that interfaces with a CardBus slot which provides video data and a direct current (DC) voltage and is configured in accordance with the standards of the Personal Computer Memory Card International Association (PCMCIA), the system comprising:
a card body configured in accordance with the standards of the PCMCIA;
a connector carried on said card body and configured in accordance with the standards of the PCMCIA to facilitate mating with said CardBus slot;

a video controller carried on said card body and coupled to said connector to receive said video data and generate, in response, a corresponding video display signal;

a transmission line carried on said card body to receive said DC voltage signal from said connector;

a head-wearable display responsive to said video display signal;

at least two metallic conductors coupled between said card body and said video display with one of said conductors coupled to said transmission line to thereby provide said DC voltage to said display; and a line driver inserted between said video controller and the other of said conductors to provide said video display signal to said display;

wherein said video controller includes:

a data fetcher that extracts said video data from said CardBus slot;

a data shifter that arranges said video data;

a synchronizer that inserts synchronization pulses into said video data; and a serializer/deserializer that serializes said video data into said video display signal.

38. The system of claim 37, wherein said video controller further includes a memory to hold said pixel stream.

* * * * *